Sept. 21, 1943.   F. H. WINTER   2,330,101
CONTROL SYSTEM
Filed May 16, 1942
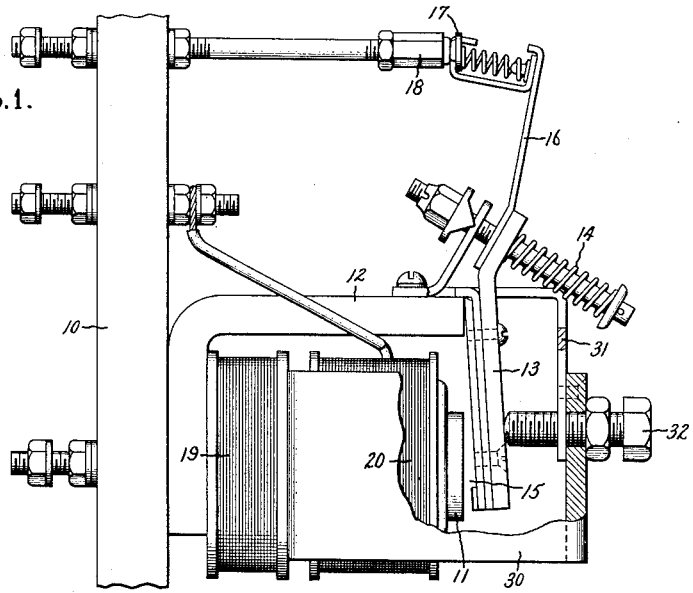
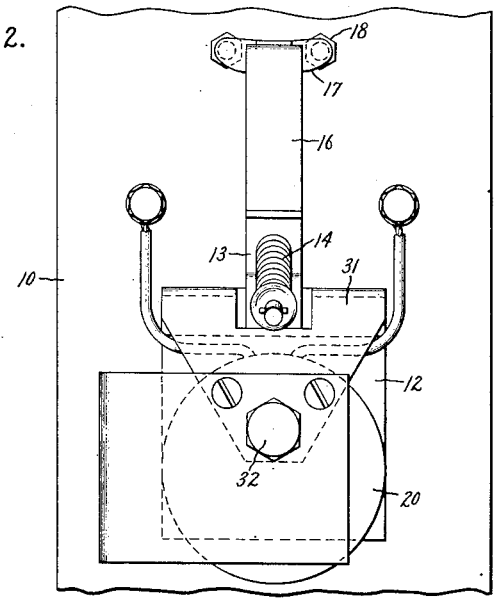
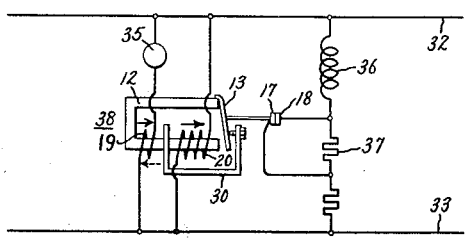
Inventor:
Fred H. Winter,
by Harry E. Dunham
His Attorney.

Patented Sept. 21, 1943

2,330,101

UNITED STATES PATENT OFFICE 2,330,101

CONTROL SYSTEM

Fred H. Winter, Schenectady, N. Y., assignor to General Electric Company, a corporation of New York Application May 16, 1942, Serial No. 443,212

6 Claims. (Cl. 172—152)

My invention relates to control systems and devices, and particularly to reverse current relays for establishing electric braking connections for an electric motor which may be overhauled by its load.

In motor control systems such as those suitable for crane hoists and the like, electric braking is generally provided for lowering a load. However, due to friction in the gearing and other parts, an appreciable load is required to overhaul the motor. Thus, where it is desired to lower a very light load or to lower the hoist with no load, it is necessary to supply power to the motor to drive the hoist down. Therefore, in order to control the motoring and electric braking connections of the crane motor, it is desirable to provide automatic means capable of distinguishing between an overhauling load and one which is not sufficient to overhaul the motor. Such automatic means may be a reverse current relay which is picked up upon cumulative energization of its series and shunt windings in motoring operation, and which drops out to establish electric braking connections when the motor current is reversed due to overhauling of the motor by the load. The dropout of such a reverse current relay is ordinarily due to bucking of the shunt flux by the reversed series flux.

Difficulty has been experienced, however, in electric braking systems of the above type due to the fact that, where a substantial amount of electric braking is required, the reversed motor current may rise to the point where, after dropout, the relay will be again picked up due to the predominance of the reversed series flux over the lesser shunt flux and the consequent establishment of a net flux of pick-up value in a reverse direction.

Accordingly, it is an object of my invention to provide a new and improved electric braking control system for an electric motor.

It is a further object of my invention to provide a new and improved reverse current relay for controlling the electric braking connections of an electric motor which may be overhauled by its load.

It is a specific object of my invention to provide in a reverse current electric braking control relay, means for preventing false operation of the relay in response to large electric braking currents.

The above and other objects are simply, inexpensively and efficiently attained according to my invention by providing magnetic lockout means for a reverse current relay armature responsive primarily to a reversed current in the series winding to retain the relay in its dropped out position. Where the relay comprises a magnetic core carrying series and shunt windings and a movable armature normally spaced from said frame by an air gap, the lockout means may suitably comprise a magnetic shunt engaging the frame and extending around the air gap and the shunt coil portion of the frame to the back of the armature to form a backstop for the armature in its dropped out position. Such a shunt does not appreciably interfere with initial pickup of the armature when the fluxes of the series and shunt windings are aiding in the core or frame, but when the fluxes are opposing in the frame the shunt completes, for the flux of only the series winding, a closed return magnetic path of low reluctance including the movable armature when the armature is in its dropped out position.

My invention itself will be better understood and its objects and advantages further appreciated by referring now to the following detailed specification taken in conjunction with the accompanying drawing in which Fig. 1 represents a side elevation partly in section of a reverse current relay embodying my invention; Fig. 2 is an end view of the relay of Fig. 1; and Fig. 3 is a simplified schematic circuit diagram of an electric motor control system arranged in accordance with my invention and including a reverse current relay of the type shown in Figs. 1 and 2.

Referring now to the drawing, I have illustrated a reverse current electric relay mounted upon an insulating base 10 and comprising a U-shaped magnetic frame formed of a magnetic core portion 11 and an L-shaped magnetic flux return member 12. To complete a magnetic circuit between the ends of the core portion 11 and the frame portion 12, I provide a movable magnetizable armature 13 pivotally mounted upon the end of the frame member 12 and movable into and out of engagement with the adjacent end of the core portion 11. By means of a spring 14 the armature 13 is biased to a normal unattracted position in spaced relation with the end of the core 11, being separated therefrom by an air gap 15. To one end of the armature 13 is attached a movable contact arm 16 carrying a movable contact 17 which is engageable with a fixed contact stud 18 mounted upon the insulating base 10.

The core portion 11 of the relay is provided with a pair of energizing windings 19 and 20 which are preferably positioned on the core 11 in longitudinally spaced relation. The winding 19 is preferably formed of an electrical conductor having a relatively large cross-section, so that it may be connected in series circuit relation with a circuit to be controlled, thereby to establish a magnetic flux in the relay proportional to the magnitude of the current in the circuit. The winding 20 is preferably a shunt winding formed of relatively small wire and connected for response to a suitable voltage of the controlled circuit.

The magnetic lockout for the armature 13 comprises a U-shaped magnetic shunt 30 extending from the portion of the core 11 intermediate the coils 19 and 20, around the air gap and the portion of the core 11 carrying the coil 20 to the back of the armature 13 thereby providing a backstop for the armature in its dropped out position and a closed return magnetic circuit through the armature 13 for only the flux of the current responsive series winding 19 when the armature is in its dropped out position shown in the drawing. One leg of the U-shaped shunt 30 is supported on the core 11, and the outer leg, which forms the backstop for the armature 13, is supported upon a non-magnetic member such as a brass bracket 31 which extends outwardly from the end of the L-shaped frame member 12. To provide for adjustably positioning the armature 13 with respect to the core 11, a magnetizable bolt 32 is mounted in the outer leg of the shunt 30 and extends toward the core to provide an adjustable abutment for positively determining the dropped out position of the armature 13.

Referring now to Fig. 3, I have shown an illustrative motor control system in which my reverse current relay is connected to control the electric braking connections for the field of a hoist motor. At Fig. 3 I have shown a hoist motor, which is preferably a series motor, connected for regenerative braking operation to a pair of power conductors 32, 33. The motor comprises an armature 35 and a field winding 36, the field winding 36 being connected in series circuit relation with a field resistor 37. The resistor 37 is arranged to be short circuited by the contacts 17 and 18 of a reverse current relay 38.

It will be understood that for motoring operation the motor armature 35 and field winding 36 will remain connected to the conductors 32, 33 as shown, if the motor is a shunt motor, while, if it is a series motor, the armature and field winding will be connected to the conductors 32, 33 in series circuit relation by suitable switching means well known to those skilled in the art. Furthermore, I wish to have it understood that my invention is not limited to regenerative braking, but that the invention may also be applied to a dynamic braking circuit in which the motor armature 35 of Fig. 3 is connected in a separate closed circuit with a dynamic braking resistor by any suitable switching means.

The relay 38 of Fig. 3 is similar to that shown at Figs. 1 and 2 and comprises a frame 12, an armature 13, a magnetic shunt 30, a series or current responsive winding 19, and a shunt or voltage responsive winding 20. The relay 38 controls the energization of the motor field winding 36 so that when motoring current is required to drive the unloaded hoist down the short circuit around the resistor 37 will be opened and the resistor inserted in series with the field winding 36. In this way the field energization of the motor is diminished and its speed increased when motoring to drive an unloaded or lightly loaded hoist down. If, however, the load is sufficiently heavy to overhaul the motor so that electric braking is required, the reverse current relay 38 will operate to short circuit the resistor 37 and increase the energization of the motor field winding thereby to provide a substantial amount of electric braking. Ordinarily, the relay 38 is designed to drop out and establish the braking connection for the motor field winding when the braking or reverse current through the relay attains a magnitude of about 15 per cent of the rated full load current of the motor. The particular purpose of my improved arrangement is to prevent the relay 38 from again picking up to establish a motor field weakening connection when the electric braking current becomes sufficiently large to overpower the effect of the shunt coil 20 and to establish in the relay frame a net flux in a reverse direction equal in magnitude to the flux required to attract the armature 13 initially.

The operation of my improved system and relay will now be clear from a joint consideration of Figs. 1, 2, and 3. The series and shunt coils 19 and 20, respectively, are so disposed upon the relay core 11 that, when motoring current is supplied for driving the crane hoist in a downward direction, the fluxes established by the coils 19 and 20 are in the same direction in the core 11. The cumulative effect of these fluxes is sufficient to attract the armature 13 to the core 11 without any substantial interference by the magnetic shunt 30. The lack of substantial interference with initial pickup by the magnetic shunt 30 is due to the fact that when the fluxes of the coils 19 and 20 are additive in the core 11, these coils tend to send fluxes through the shunt 30 in opposite directions, thus keeping the net flux in the shunt 30 to a minimum. This effect will be clear by assuming first that the initial additive fluxes established by the coils 19 and 20 are in the direction indicated by the full line arrows at Fig. 3. The flux of the series coil 19 will tend to pass through both the shunt coil portion of the armature and the air gap 15, and in parallel through the magnetic shunt 30 from the core 11 to the back side of the armature 13, thence through the armature 13 and frame 12. Simultaneously, however, the flux established by the shunt coil 20 will tend to pass through the air gap 15, armature 13 and the frame 12, and in parallel through the air gap 15 and the magnetic shunt 30 in a direction from the back side of the armature 13 to the core 11. Thus, when the fluxes established by the coils 19 and 20 are additive in the core 11, they are opposing in the shunt 30, so that the major portion of the flux passes through a normal magnetic circuit comprising the core 11, the air gap 15, the armature 13, and the frame member 12.

Thus, when motoring current is supplied to the armature 35 to drive a light load downwardly, the relay 38 will pick up to weaken the motor field 36 and increase the motor speed in a downward direction. If, however, the load is sufficiently heavy to overhaul the motor, the motor will be driven as a generator and the current through the armature 35 will be reversed. The current through the shunt winding 20 of the relay 38, however, will remain unchanged. Thus, the fluxes established by the windings 19 and 20 of the relay will be opposing in the core 11. The relay may be designed so that these opposing fluxes substantially neutralize each other at any desired percentage of normal load current. At this point the relay armature 13 will drop out and close its contacts 17, 18 to short circuit the resistor 37 and increase the energization of the field winding 36 thereby to establish a substantial electric braking effort.

Referring now to Fig. 3, with the motor armature current reversed the flux of the series winding 19 is in the direction shown by the dotted arrow, so that in the core 11 it opposes the flux of the shunt winding 20, while in the magnetic shunt 30 it tends to pass in a direction from the back side of the armature 13 through the core 11. The series flux in the magnetic shunt 30 is no longer opposed by the effect of the short circuited shunt coil flux passing through the magnetic shunt, since both these fluxes are in the same direction in the shunt 30. Therefore since the series coil flux through the shunt 30 is not bucked down, the reverse current in the winding 19 is able to establish a strong lockout magnetic flux through the closed magnetic circuit comprising the series coil portion of the core 11, the magnetic frame member 12, the armature 13, the bolt 32, and the magnetic shunt 30. With this arrangement there is no tendency for the relay armature to be re-attracted to the core as the reverse current in the relay winding 19 increases with increase in the electric braking effort. The increased reverse current in the winding 19 overcomes the effect of the shunt winding 20 and tends to establish a predominating flux in the relay frame. However, rather than re-establishing a pickup force for the armature 13, the predominating series flux has a continually increasing lockout effect upon the relay armature 13 as a result of the closed magnetic circuit around the air gap through the shunt 30 and back face of the armature.

The effect of the magnetic shunt 30 may be enhanced by restricting the cross section of the core 11 in the region of the series winding 19 thereby to limit by saturation the magnitude of the flux therethrough. In this way false pickup of the armature after saturation of the shunt 30 may be prevented.

It will be evident to those skilled in the art that my invention is not limited to the exact arrangements shown in the drawing but that the drawing is only illustrative and that by a suitable use of auxiliary contactors and relays, a reverse current relay having either normally open or normally closed contacts may be used to control the motoring and braking connections of either a shunt motor or a series motor.

Thus, while I have illustrated only a preferred embodiment of my invention by way of illustration, many other modifications will occur to those skilled in the art and it will therefore be understood that I intend by the appended claims to cover all such modifications as fall within the true spirit and scope of my invention.

What I claim as new and desire to secure by Letters Patent of the United States is:

1. In a polarized relay for controlling an electric circuit, a pair of cooperating switch contacts, a U-shaped magnetic frame including a core portion, a polarized winding and a control winding mounted upon said core portion in longitudinally spaced relation, a magnetic armature pivotally mounted upon one end of said frame and movable between attracted and unattracted positions with respect to said core portion to control said contacts, said armature being biased to said unattracted position spaced from said core portion to provide an air gap therebetween, said frame and said armature providing a substantially closed magnetic circuit for the flux established by both said windings when said armature is in said unattracted position, and a magnetic shunt extending from said core portion at a point between said windings to the back of said armature to provide a back-stop for said armature and magnetically to short circuit said air gap and the portion of said core upon which said polarizing winding is mounted, whereby when said control winding is cumulatively energized with respect to said polarizing winding to establish additive fluxes in said core portion they set up opposing fluxes in said magnetic shunt thereby to move said armature to said attracted position and when said control winding is oppositely energized to establish opposing fluxes in said core portion the windings set up additive fluxes in said magnetic shunt thereby drop out said armature and magnetically to retain said armature in said unattracted position against said back-stop, said frame comprising a saturable portion for limiting the total flux in said frame after saturation of said shunt.

2. In a polarized electric relay for controlling an electric circuit, a magnetic core member, a polarizing winding and a control winding mounted upon said core member, a movable armature and a magnetizable frame including a saturable section for completing a normal return magnetic circuit for the flux of both of said windings, said armature being movable between attracted and unattracted positions with respect to said core member and being biased in said unattracted position normally to establish an air gap between said armature and said core member, said windings when cumulatively energized with respect to said core member establishing a flux through said core member, said normal magnetic circuit and said air gap to attract said armature and when oppositely energized by reversal of current in said control winding permitting said armature to return to said unattracted position, and magnetic lockout means for preventing re-attraction of said armature upon substantial increase and predominance of the reversed current in said control winding comprising a magnetizable member arranged to carry opposing fluxes from said windings when said windings are cumulatively energized thereby to offer substantially no magnetic lockout resistance to initial attraction of said armature and to carry the sum of the fluxes of said windings when said windings are oppositely energized thereby to lock said armature in said unattracted position, said saturable section of said frame being effective after saturation of said magnetizable member to prevent false reattraction of said armature.

3. A motor control system comprising an electric motor drivingly connected to an overhauling load, said motor having a field winding, means for connecting said motor to a source of electric power supply to drive said load, means for establishing electric braking connections for said motor, a reverse current relay for controlling the energization of said field winding to distinguish between motoring and braking operation of said motor, said relay being arranged to be actuated to establish a motoring connection for said field winding when power is supplied to said motor and to drop out upon occurrence of a predetermined minimum reverse braking current in said motor thereby to establish an electric braking connection for said field winding, and magnetic lockout means for said relay operable upon a substantial increase in said reverse current to prevent reactuation of said relay during braking operation of said motor.

4. A motor control system comprising a direct current electric motor drivingly connected to an overhauling load, said motor having a field winding, means for connecting said motor to a source of electric power supply to drive said load, means for establishing electric braking connections for said motor, a reverse current relay for selectively controlling the energization of said field winding in accordance with motoring or braking operation of said motor, said relay being provided with a current responsive winding connected in series circuit relation with the armature of said motor and a voltage responsive winding connected in parallel circuit relation with said armature and having a movable element actuable to an attracted position to establish a motoring connection for said field winding when said current responsive and voltage responsive coils are cumulatively energized, means for biasing said movable element to an unattracted position thereby to establish an electric braking connection for said field winding upon the occurrence of a predetermined minimum reverse current in said current responsive winding due to braking operation of said motor, and magnetic lockout means responsive to the magnitude of said reverse current to prevent reattraction of said movable element during braking operation of said motor.

5. In a motor control system for an electrically driven hoist, a direct current driving motor having a field winding, means for connecting said motor to a source of electric power supply for motoring operation to lower said hoist, means for establishing electric braking connections for said motor, a reverse current relay for controlling the energization of said field winding, said relay comprising a series coil and a shunt coil cumulatively energized for actuating said relay to decrease the energization of said field winding when power is being supplied to said motor to lower said hoist thereby to obtain high speed lowering operation, the current in said series coil being reversed upon overhauling of said motor by its load thereby to drop out said relay and increase the energization of said field winding for electric braking operation of said motor, and a magnetic shunt completing a closed magnetic circuit for the flux of only said series field winding when said relay is in its dropped out position thereby to prevent the establishment of a reversed actuating flux for said relay and to substitute therefor a magnetic lockout flux substantially proportional to the magnitude of said reversed current.

6. In a control system for an electrically driven hoist, a direct current driving motor having a field winding, means for connecting said motor to a source of electric power supply for motoring operation to lower said hoist, means for establishing electric braking connections for said motor, a reverse current relay for controlling the energization of said field winding, said relay comprising a U-shaped magnetic frame and a magnetic armature movable between attracted and unattracted positions with respect to said frame, a magnetic shunt extending between said frame and said armature when said armature is in said unattracted position, an energizing winding for said relay connected in series circuit relation with the armature of said motor, a voltage responsive energizing winding for said relay connected in parallel circuit relation with said motor armature, said energizing windings and said shunt being so arranged that when power is supplied to said motor to lower said hoist said windings establsh cumulative fluxes in said frame and opposing fluxes in said shunt and when the current in said series winding is reversed upon braking operation of said motor said windings are oppositely energized with respect to said frame and cumulatively energized with respect to said shunt, whereby in motoring operation to lower said hoist said armature is actuated to said attracted position without appreciable interference from said shunt and in electric braking operation said armature drops out and is magnetically retained in said unattracted position by the flux traversing said shunt.

FRED H. WINTER.